(12) United States Patent
Vardanyan et al.

(10) Patent No.: US 8,668,810 B1
(45) Date of Patent: Mar. 11, 2014

(54) DEVICE AND METHODS FOR PROCESSING CARBON BASED MATERIALS

(71) Applicant: Amass Energy LLC, Los Angeles, CA (US)

(72) Inventors: Gagik Vardanyan, Glendale, CA (US); John Howard Arzoian, Beverly Hills, CA (US); Movses Khayoyan, Glendale, CA (US)

(73) Assignee: Amass Energy LLC, Los Angeles, CA (US)

( * ) Notice: Subject to any disclaimer, the term of this patent is extended or adjusted under 35 U.S.C. 154(b) by 0 days.

(21) Appl. No.: 13/744,336

(22) Filed: Jan. 17, 2013

(51) Int. Cl.
*C10B 19/00* (2006.01)
(52) U.S. Cl.
USPC ............ 201/19; 201/25; 585/240; 585/241
(58) Field of Classification Search
USPC .......... 201/19, 25; 422/186.01; 585/240, 241; 110/345; 219/624, 686, 756
See application file for complete search history.

(56) References Cited

U.S. PATENT DOCUMENTS

| | | | | |
|---|---|---|---|---|
| 4,644,877 | A * | 2/1987 | Barton et al. | ................ 588/311 |
| 4,647,443 | A | 3/1987 | Apffel | |
| 4,839,151 | A | 6/1989 | Apffel | |
| 5,330,623 | A * | 7/1994 | Holland | .......................... 201/19 |
| 5,362,468 | A * | 11/1994 | Coulon et al. | ............ 423/445 R |
| 5,387,321 | A | 2/1995 | Holland | |
| 5,449,438 | A | 9/1995 | Jagau et al. | |
| 6,830,662 | B2 * | 12/2004 | Cha | .......................... 204/157.15 |
| 7,101,464 | B1 | 9/2006 | Pringle | |
| 7,802,528 | B2 | 9/2010 | Shuman et al. | |
| 8,466,332 | B1 * | 6/2013 | Hemmings et al. | ........... 585/241 |
| 2006/0280672 | A1 | 12/2006 | Vardanyan | |
| 2008/0202395 | A1 * | 8/2008 | Jeong | ............................ 110/203 |
| 2010/0087554 | A1 | 4/2010 | Berezin et al. | |
| 2011/0048916 | A1 | 3/2011 | Novak | |
| 2011/0198207 | A1 | 8/2011 | Johnson | |
| 2011/0224473 | A1 * | 9/2011 | Denton | ........................... 588/14 |

FOREIGN PATENT DOCUMENTS

JP         6226234 A          8/1994
WO        WO 02/33320   *    4/2002

OTHER PUBLICATIONS

Nakanoh, Katsuhiro, Shizuo Hayashi, Kiyonori Kida. "Waste Treatment Using Induction-Heated Pyrolysis." Fuji Electric Review. vol. 47, No. 3, pp. 69-73.

* cited by examiner

*Primary Examiner* — Nina Bhat
(74) *Attorney, Agent, or Firm* — Jeffrey G. Sheldon; Sheldon Mak & Anderson

(57) ABSTRACT

A process for the pyrolysis of waste material and/or organic material in a pyrolysis reactor is provided. According to the process, the material is placed in the reactor and heated with an induction heater, optionally in the presence of one or more soft magnets. The products of the pyrolysis reaction, such as gases and liquids may be collected in a storage vessel attached to the reactor. A pyrolysis reactor for the pyrolysis of waste and/or organic material is also provided.

19 Claims, 7 Drawing Sheets

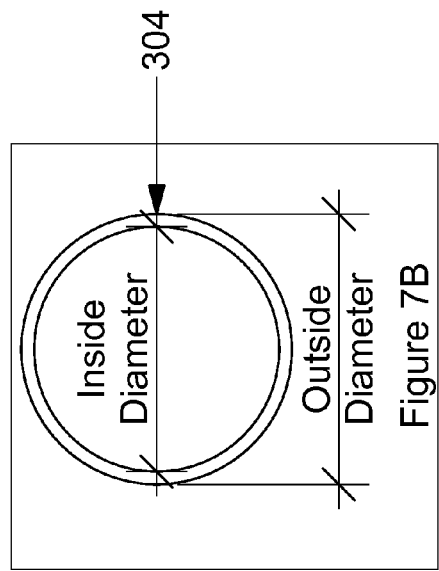
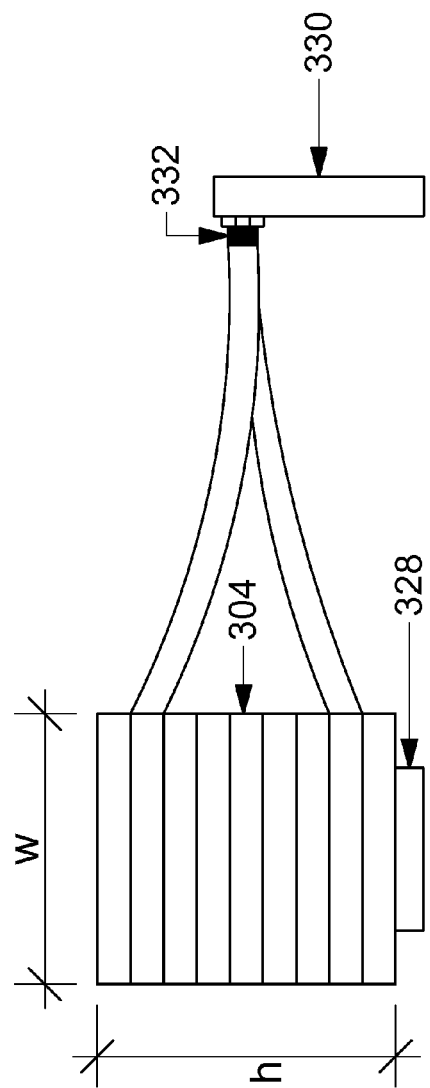

DEVICE AND METHODS FOR PROCESSING CARBON BASED MATERIALS

BACKGROUND

Disposal of waste materials from communities and industry is a serious environmental concern. As population increases, waste volume is also increasing, as well as the space it occupies, and the deleterious effects on the environment. In general, waste from communities and various types of industrial facilities varies widely in composition, and may include, for example, organic waste, such as kitchen and yard waste, polymeric materials, such as various forms of plastic and tires, scrap wood, oil-impregnated rags, and refuse oils, all of which are organic, as well as inorganic materials, such as construction debris, scrap metal, and increasingly, heavy metals from electronics disposal.

Disposal of waste materials by combustion has not been favored, particularly in the United States, because of the production of environmental pollutants produced by the combustion, such as particulate matter from incomplete combustion and noxious gases. However, in urban areas, landfill sites are increasing capacity, and the public is becoming increasingly focused on reuse and recycling of waste materials, instead of burying trash in traditional waste disposal landfills. Accordingly, there is a need for alternate methods of waste disposal.

Pyrolysis of waste is currently known. In pyrolytic waste treatment, organic materials are heated in an environment with little or no oxygen content to convert the organic components of waste to decompose products, generally carbonaceous residue and resultant gases, which are scrubbed and released into the environment.

However, known pyrolytic waste treatment apparatus and methods have proved unworkable or economically unfeasible, inefficient, and/or unreliable in continuous operation, and further there is a need to pretreat the waste in some processes. They are also generally large industrial scale apparatus, some having large conveyor portions for waste delivery which is unsuitable for smaller scale applications. Further, known pyrolytic waste treatment apparatus and methods do not allow for the production and collection of lower molecular weight feedstock liquid chemicals and gases that are a product of the pyrolytic decomposition.

Therefore, there is a need for an improved pyrolytic waste treatment system and methods that are highly efficient, capable of operation with a wide variety of waste materials, and are variable in size from industrial to consumer (individual) size systems. It is further advantageous that the waste does not need to be pre-treated for economic efficiency. To meet these needs, it is also desirable that there is ease of operation and does not use a conveyor apparatus. There is also a need for a pyrolytic waste treatment system that is capable of collecting decomposition products and of controlled pyrolysis to produce feedstock chemicals which can also be collected.

SUMMARY

A pyrolysis apparatus and a process for the pyrolysis of organic and waste materials is provided. The apparatus may be used with a wide variety of waste materials and may be configured in varying sizes from small (for individual or household use), medium (for commercial use), and large (for industrial waste disposal).

The pyrolysis apparatus has a pyrolysis chamber that includes an induction coil, a pyrolysis container positioned within the induction coil, and preferably one or more soft magnets. A generator is electrically connected to the pyrolysis chamber for supplying current to the induction coil. A vacuum pump is connected to the pyrolysis chamber for evacuating the pyrolysis chamber. The apparatus also includes one or more storage vessels, connected exterior to the pyrolysis chamber, for the storage of pyrolysis products and may include a cooler for delivering a coolant to the coil. The apparatus provides for controlled pyrolysis by varying reaction parameters such as reaction time, temperature, oxygen content, and magnetic field strength and/or amplitude. Accordingly, the user can vary the production of pyrolysis products into the specified products.

Preferably, the storage vessels are detachable such that gas and liquid pyrolysis products obtained from the pyrolysis of the organic and waste materials may be removed for later or off-site use. Also preferably, the components of the apparatus are configured in a vertical or stacked arrangement such that the footprint of the apparatus is small and it can be used in relatively small spaces without a conveyer apparatus.

The process according to the invention comprises the pyrolysis of organic and waste materials in a pyrolysis apparatus. According to the invention, first, the material for pyrolysis is selected as well as the process parameters for the selected materials. The process parameters may be varied according to the material selected and the desired specified products. Then, the material is placed in a pyrolysis container comprising a body, which is preferably conducting and has a vented portion and optionally a filter. In certain embodiments, the container comprises an inner vial which is the vented portion and an outer tube comprising the conducting body. The pyrolysis container is then inserted into an induction coil within a process chamber of the apparatus. The process chamber is then closed, evacuated, and power is transferred to the induction coil. Power is delivered at the selected and/or varied level to cause the material in the pyrolysis container to decompose, producing the pyrolysis products. The gas and/or liquid pyrolysis products are then collected in one or more storage areas connected to the apparatus. When the apparatus is powered down, the solid pyrolysis products and any unprocessed material may be removed from the reactor, and the gas or liquids in the storage areas may be removed.

The process may be varied for different materials where different process parameters are selected for different materials to be processed, including a selected pressure, thermal field and magnetic field, to produce the desired specified products.

According to another embodiment, a method of recovering lower order carbon containing products from higher order carbon containing feedstock materials with a combination of magnetic and thermal fields is provided. According to this embodiment, first, a carbon containing feedstock material is provided. Then, the feedstock material is placed into a reactor vessel, and the ambient air is removed from the vessel. The reactor vessel is then energized with a combination of thermal and magnetic fields and held at a selected temperature for a selected time period to cause the feedstock material to break down into lower order carbon containing products. The lower order carbon containing products are then collected and/or processed for further use, storage, and/or transport.

FIGURES

These and other features, aspects and advantages of the present invention will become better understood from the following description, appended claims, and accompanying figures where:

FIG. 7A is a front view of a coil shown on a ceramic platform according to another embodiment of the invention;

FIG. 7B is a top view of the coil shown in FIG. 7A;

FIG. 7C is a front view of a coolant supply conduit according to another embodiment of the invention.

DESCRIPTION

Figure 1:
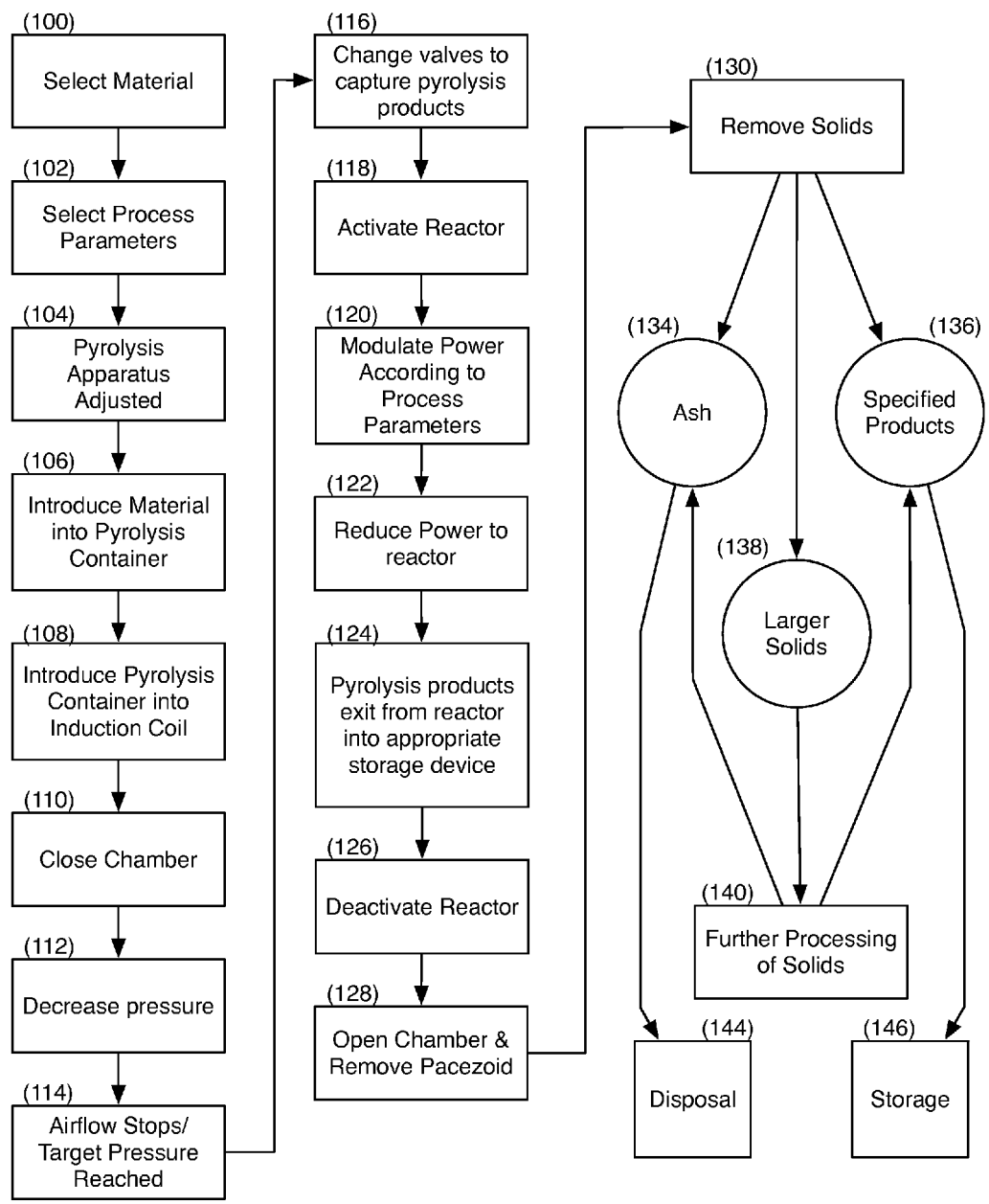
FIG. 1 is a flow chart of a process for pyrolysis of a material according to one embodiment of the invention.

According to one embodiment of the present invention, there is provided a process for thermal decomposition of a carbonaceous material by pyrolysis. According to the process, the carbonaceous material is heated substantially in the absence of oxygen to produce gases, liquids, and solid residue. The products are collected and may be used as fuels, or they can be utilized as feedstock for chemical or material industries. The types of materials which are candidates for pyrolysis processing include crude and waste oil, coal, plant biomass (e.g., agricultural waste and plant matter), animal and human waste, industrial waste, food scraps, paper, cardboard, plastics, rubber, and electronics waste, for example.

Advantages of the current process include high efficiency, i.e., minimal energy consumption, and low environmental emissions. The process has a rapid cycle time and is scalable for a variety of applications from large industrial scale, moderate commercial scale, and small home/personal scale. The process and apparatus described herein can replace existing pyrolysis technologies and can be introduced into municipalities as a method of large scale waste disposal. As described herein, the pyrolysis method and apparatus is a zero emission process. Accordingly, $CO_2$ from waste or other carbon containing materials is either converted and trapped as lower molecular weight carbon feedstock and gases for later use, or is trapped in carbon residue, such as biochar. Accordingly, the pyrolysis method and apparatus has the potential to capture and sequester large quantities of $CO_2$ and reduce the current environmental impact of waste disposal. Examples of Existing Processes that can be replaced include:

Destructive distillation
Dry distillation
Karrick process
Torrefaction
Thermal depolymerization
Plasma Converters
Staged reforming As used in this disclosure, the following terms have the following meanings: "Higher order carbon containing feedstock material" means an organic material or waste material having a hydrocarbon component which has a high molecular carbon content, generally, greater than $C_{16}$, such as polymer containing waste materials (such as plastic and tires), waste oil and crude oil.

"Lower order carbon containing feedstock material" means an organic material having a hydrocarbon component which has a low molecular carbon content, or lower than the starting higher order carbon containing feedstock, generally, $C_{16}$ or less.

"Organic Material" means natural and other carbon containing substances which do not fall into the category of waste. Organic materials include oil, coal, and biomass, for example;

"Pyrolysis" is the thermochemical decomposition of organic material at elevated temperature in a reduced oxygen environment. Pyrolysis of organic substances produces gas and liquid products and leaves a solid residue rich in carbon content.

"Waste" means materials that are not prime products (that is products produced for the market) for which the initial user has no further use in terms of his/her own purposes of production, transformation or consumption, and of which he/she wants to dispose.

"Specified Products" means the solid, liquid, and gas products of pyrolysis which vary depending on the material used in the pyrolysis and the pyrolysis process conditions. The pyrolysis process has varying parameters to achieve desired amounts of the three products depending on process conditions, and the yield of various specified products from pyrolysis varies heavily with temperature.

The term "material", as used in this disclosure, may refer to solids, liquids, gases, or combinations thereof.

As used in this disclosure, the term "comprise" and variations of the term, such as "comprising" and "comprises," are not intended to exclude other additives, components, integers or steps.

According to one embodiment of the invention, a process for the pyrolysis of waste material and/or organic material in a pyrolysis reactor is provided. Referring now to FIG. 1, according to the process, first, a pyrolysis material is selected (100). The process parameters for the selected material and desired pyrolysis products are then selected (102), and the pyrolysis apparatus is then adjusted for use (104). The materials are then placed in a pyrolysis container (106) which is inserted into an induction coil (108) within a process chamber of the pyrolysis reactor. The process chamber is then closed (110), and the chamber pressure is decreased by evacuating the chamber to a vacuum atmosphere within the process chamber (112). When the process chamber of the pyrolysis reactor has been sufficiently evacuated such that a target pressure is reached (114), the pyrolysis apparatus is adjusted to capture the pyrolysis products (116). The pyrolysis reactor is then activated by transferring power to the induction coil within the pyrolysis reactor (118), and power is maintained and/or modulated at the selected level (120) to cause the pyrolysis container to become heated and the material in the pyrolysis container to decompose, thereby producing pyrolysis products. Power is then reduced to the pyrolysis reactor (122), and the pyrolysis products exit from the reactor into one or more gas or liquid pyrolysis product storage areas where they are collected (124). The pyrolysis products which are collected are preferably passed from the pyrolysis container through the pyrolysis reactor to a storage vessel. The pyrolysis product may be a gas which is collected in a gas storage vessel attached to the pyrolysis reactor, or the pyrolysis product may be a liquid which is collected in a liquid storage vessel attached to the pyrolysis reactor. Preferably, at least one of the pyrolysis products is a gas which is collected and stored. After collection of the pyrolysis products, the reactor is deactivated (126), the process chamber is then opened and the pyrolysis apparatus is opened and/or removed from the chamber (128). Residual solids from the pyrolysis reaction are then removed from the pyrolysis apparatus (130) and separated into various components such as ash (134), larger solids (138) and specified products (136). Larger solids (138) may be further processed (140) in the pyrolysis apparatus by repeating steps 106-130 to further reduce to ash (34) and specified products (136). The ash (34) and/or specified products (136) may then be disposed (144) or stored (146).

According to one embodiment of the invention, electrical current may be varied to the induction coil (also called a coil-shaped conductor, work coil, or inductor). When an alternating current is passed through the coil, an alternating field is set up in that coil (and also around it). The container 106, which is a metal or a conductor and which is placed in this field, generates an electric tension or voltage which causes a current to flow. The direction of the current thus generated is such that the magnetic field associated with this current tends to keep the original field constant (Lenz's law). The electrical energy is determined by the relation $\emptyset=I2R$, where $\emptyset$ is the electrical power in watts, I the current in amperes and R the resistance in ohms of the container. This resistance is not the quantity which would be from a direct-current measurement but the resistance to high-frequency alternating current which depends not only on the resistivity of the material but also on the frequency of the alternating current (e.g., "the skin effect") and the relative permeability of the material to be heated.

According to the process shown in FIG. 1, the process parameters, including time (process time), chamber pressure, thermal field and magnetic field (magnet configuration) are selected according to the material processed, the size (quantity) of the material to be processed, and average material size and power supply, as will be understood by those of skill in the art with reference to this disclosure. Table 1 shows an example of the parameters for the pyrolysis process for various waste materials. The parameters shown in Table 1 were for the material indicated below, for the amount of material indicated below, as determined on a SEF Erscem Multi vac reactor made by Sef-Erscem (Nanterre, France), described herein.

TABLE 1

Process Parameters for Various Waste Materials

| Raw Material | Automotive Tire Waste | Mixed Household Waste | Crude Oil | Electronics Motherboard |
| --- | --- | --- | --- | --- |
| Weight | 50 grams | 12 grams | 9 grams | 15 grams |
| Pressure (initial before process power) | 17-19 mm Hg, generally <20 mm Hg | 17-19 mm Hg, generally <20 mm Hg | 17-19 mm Hg, generally <20 mm Hg | 17-19 mm Hg, generally <20 mm Hg |
| Generator | 5 kW | 5 kW | 5 kW | 5 kW |
| Process Power | 0.5 Amps | 0.5 Amps | 0.5 Amps | 0.5 Amps |
| Time (Time Raw Material is Energized) | 30 Seconds Power 2 times | 30 Seconds Power 2 times | 30 Seconds Power 2 times | 30 Seconds Power 2 times |
| Time to Evacuate Process Gas | Approx. 30 Seconds | Approx. 30 Seconds | Approx. 30 Seconds | Approx. 30 Seconds |
| Process Cycle Time | approx. 5 minutes | approx. 5 minutes | approx. 5 minutes | approx. 5 minutes |
| Materials Obtained from Processing | Carbon Black Ash 1,2-pentadiene 1,3-butadiene | Ash Styrene Nonane Decane | To be determined | To be determined |

According to the method shown in FIG. 1 and described herein, the pyrolysis of waste includes materials generated during the extraction of raw materials, the processing of raw materials into intermediate and final products, the consumption of final products, and other human activities, including, for example, municipal waste, such as household waste, commercial waste, and demolition waste, hazardous waste, industrial waste, and bio-medical waste, such as clinical waste. Specific examples include waste oil, plant biomass (e.g., agricultural waste and plant matter), animal and human waste, industrial waste, food scraps, paper, cardboard, plastics, and rubber. Also included in the pyrolysis process and methods described herein are the processing of electronics waste to extract heavy and precious metals. The pyrolysis process and methods described herein are particularly useful for separating high value metals from carbon based materials.

Specific examples of candidates for materials used in pyrolysis are shown below:
    Transform Waste material for Ease of Handling
        Medical Waste
            Reduce Bio Hazards in Medical Waste
            Reduce Waste Bulk
        Household Waste
            Reduce Bulk
        Municipal Waste
            Reduce Bulk
        Tire Waste
            Reduce Material Bulk and/or
            Transform to usable or recyclable products
        Municipal Waste Water
            Reduce Environmental Hazards
    Transform Waste Material into Specified Products
        Tire to Carbon Black
        Municipal Waste to Combustible Gas
        Electronic Waste
            Separation and/or extraction of heavy and precious metals The pyrolysis of Organic Materials includes processes used in the chemical industry, for example, to produce charcoal, activated carbon, methanol, and other chemicals from wood, to convert ethylene dichloride into vinyl chloride to make PVC, to produce coke from coal, to convert biomass into syngas and biochar, and for transforming medium-weight hydrocarbons from oil into lighter ones like gasoline. These specialized uses of pyrolysis may be called various names, such as dry distillation, destructive distillation, or cracking.

Specific examples are shown below:
    Transform Raw Materials for Ease of Handling
        Large Pieces of Plastics to Small Pieces of Plastics
    Transform Raw Material into Specified Products
        Coal to Methane
        Magnomethanation, Coal to Methane (Gas)
        Heavy Oil to Light Oil Oil to Carbon Black
Break Down Mineral Salts
Bio Mass to Combustible Gas The process may be performed on a variety of scales from table top (home) use, where the materials are on the gram scale; intermediate scale, where the materials are on the kilogram scale; or on the industrial scale, where the process may be carried out in a large reactor on a ton scale.

Figure 2:
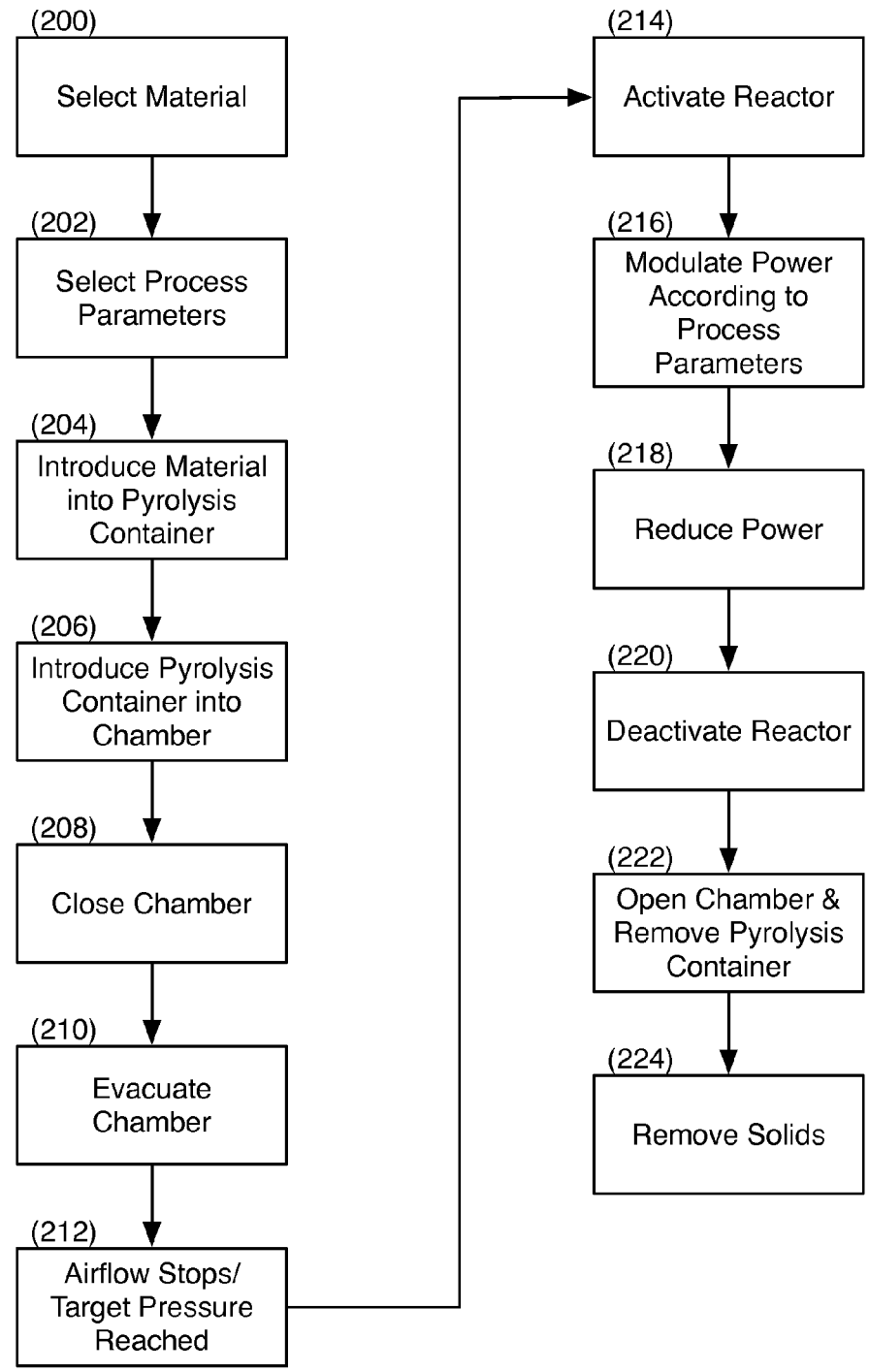
FIG. 2 is a flow chart of another embodiment of a process for pyrolysis of a material according to the invention.

According to another embodiment, a process for the pyrolysis of organic and waste materials in a pyrolysis apparatus is provided. As shown in FIG. 2, according to this process, first a material is selected for pyrolysis (200), and the parameters for pyrolysis of the selected materials are selected (202). The material is placed in a pyrolysis container (204), the pyrolysis container comprising a conducting body, a filter, and a vented portion. The pyrolysis container is inserted into an induction coil within a process chamber (206), the process chamber comprising one or more soft magnets. The process chamber is then closed (208) and evacuated to create a vacuum atmosphere within the process chamber (210, 212). The reactor is then activated by transferring power to the induction coil (214) within the pyrolysis reactor to create a thermal field and a magnetic field within the pyrolysis reactor. Power is maintained and/or modulated within the pyrolysis reactor (216) at a selected level and/or until the pyrolysis container becomes heated and the material in the pyrolysis container decomposes, producing pyrolysis products. Power to the reactor is then reduced (218), and the reactor is deactivated (220). Optionally, the pyrolysis container may then be removed from the chamber (222), and residual solids may also be removed from the pyrolysis container (224). Also optionally, as further processing, pyrolysis products such as solids, liquids and gases may be collected as described herein.

According to another embodiment of the invention, a method of recovering carbon products from decomposition of higher order carbon containing feedstock material with a combination of magnetic and thermal fields is provided. According to the method, first, a carbon containing feedstock material is selected. Next, the feedstock material is placed into a reactor vessel, and the pressure in the reactor vessel is substantially reduced to remove ambient air from the reactor vessel. Then, the reactor vessel is energized with a combination of fields including a thermal field and a magnetic field. The reactor is held at a selected temperature for a selected time period to cause the feedstock material to break down into lower order carbon containing products. The lower order carbon containing products are then collected, preferably in a vessel attached to the reactor, and the remaining solids are removed from the reactor vessel. This embodiment is particularly useful in transforming raw materials into feedstock or other chemical products, such as coal to methane, heavy oil to light oil, oil to carbon black, and biomass to combustible gas, but the process may also be used to process waste materials.

According to another embodiment of the invention, a pyrolysis apparatus for the process of organic or waste materials, or the conversion of higher order carbon materials to lower order carbon containing materials as described herein, is provided. The apparatus comprises an electrically conductive workpiece, a work coil to generate an alternating magnetic field, a chamber for containing the electrically conductive workpiece and work coil, a source of high frequency electrical power, and preferably, one or more soft magnets.

Figure 3:
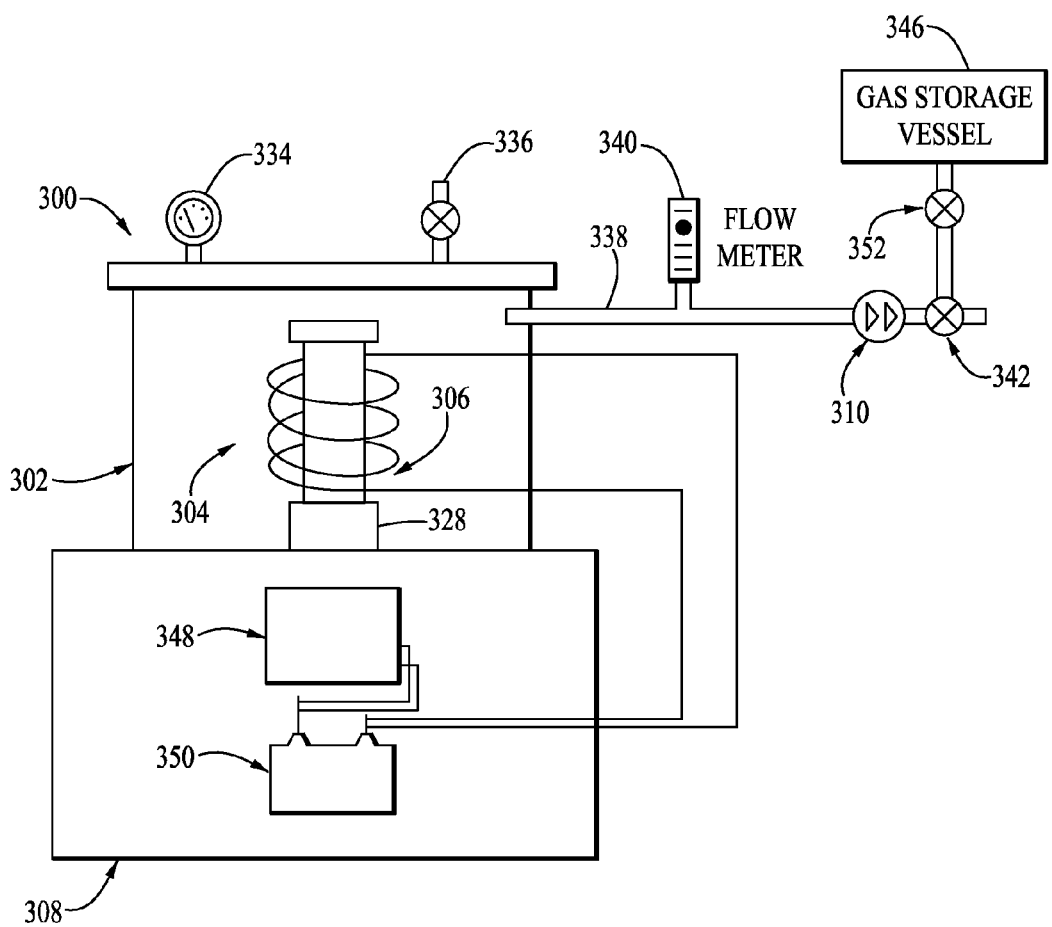
FIG. 3 shows a pyrolysis reactor according to another embodiment of the invention.

Referring now to FIG. 3, in a preferred embodiment, the apparatus 300 comprises pyrolysis chamber 302 having an induction coil 304 and a pyrolysis container 306, a generator 308 for supplying power to the pyrolysis chamber 302 and induction coil 304, and a vacuum pump (system) (not shown) for evacuating the pyrolysis chamber 302.

Figure 4A:
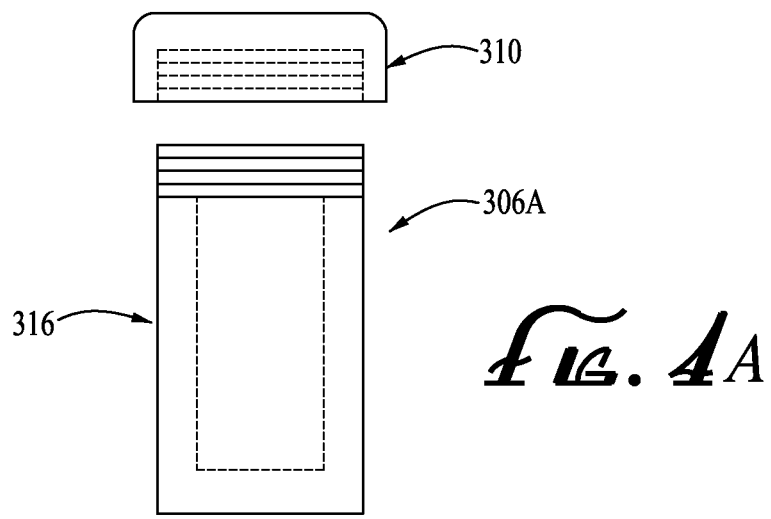
FIG. 4A is a front view of a pyrolysis container for the pyrolysis of a solid according to another embodiment of the invention.

Preferably, the pyrolysis container 306 acts as a carrier of raw material and processed materials. The pyrolysis container 306 comprises a conducting material to facilitate the induction process and may be formed from a variety of materials including copper, steel, graphite and various alloys suitable for the process, as will be understood by those of skill in the art. The container 306 may act as a filter or contain a separate filter to trap processed materials from escaping into the vacuum system. In one embodiment, the pyrolysis container 306 comprises a vessel for processing solid materials 306A, as shown in FIG. 4A. According to this embodiment, the container 306A comprises a solid bottom, and a removable top 310, i.e., a top with the ability to open. The top 310 when joined with the container 306, creates a filter 312 (not shown) which is smaller than the particle size of the processed materials, such that the processed materials (particles) will not escape into the chamber 302 and vacuum system. In this embodiment, the seal acts as a filter to substantially contain the solid components of the pyrolysis reaction within the pyrolysis container. However in other embodiments, the container 306 may contain a separate filter 312 either detachable or integral. The top 310 also has one or more gas vents 314 (not shown) to allow escape and optional capture of process gases. The body 316 of the container 306A is a conducting material to facilitate induction heating, and may be of varying shapes, but preferably is an elongated shape or other shape which fits within the coil 304. Preferably, the container 306A is formed of stainless steel.

Figure 4B:
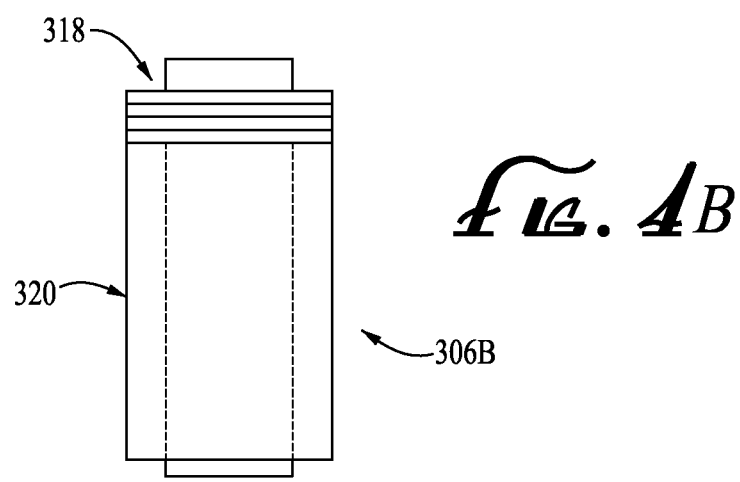
FIG. 4B is a front view of a pyrolysis container for the pyrolysis of a liquid according to another embodiment of the invention.

According to another embodiment, shown in FIG. 4B, the pyrolysis container 306 comprises a vessel for processing liquid materials 306B. According to this embodiment, the container 306B comprises an inner vial 318 comprised of heat tempered glass or another material able to withstand the temperatures of the reaction, and an outer tube 320 comprising a conducting material to facilitate induction heating. The tube 320 may be open ended as shown, or comprise a top and/or bottom as shown in FIG. 4A. The inner vial 318 has a closed bottom to hold a liquid.

Figures 5, 6:
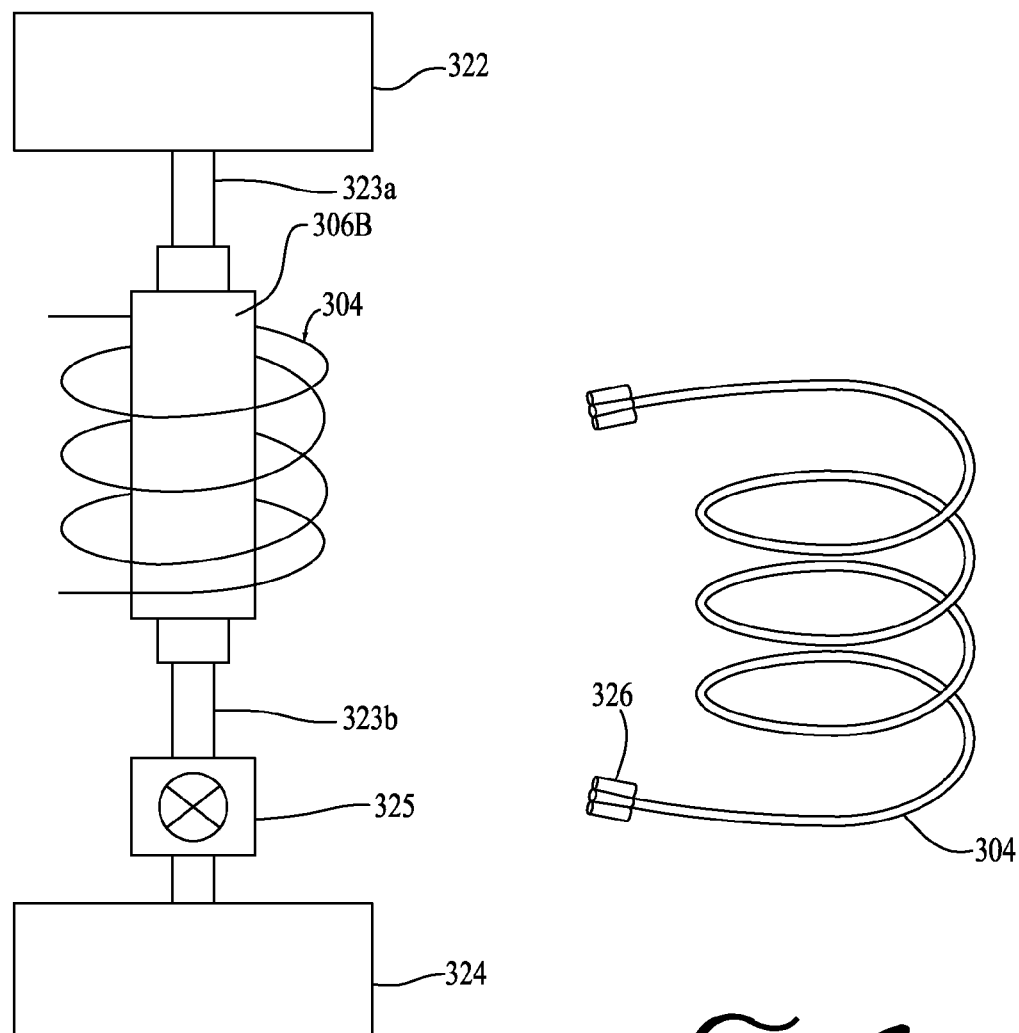
FIG. 5 is a front view of a flow through pyrolysis container which may be used in the apparatus shown in FIG. 3 according to another embodiment of the invention.
FIG. 6 is an expanded view of the coil shown in the pyrolysis reactor of FIG. 3 according to another embodiment of the invention.

According to another embodiment shown in FIG. 5, the apparatus comprises a flow through apparatus having a liquid flow container and liquid storage vessel. Preferably, this apparatus is used to process heavy oil to light oil in a flow through process. According to this embodiment, one end of the tube has a liquid feedstock (material) vessel 322, which feeds to the pyrolysis container 306B through a first conduit 323a. The liquid pyrolysis product(s) then feed through a second conduit 323b to a capture vessel 324 to capture the processed materials. A meter/pump/valve 325 may be included to monitor the process and feed material to the reaction container 306B.

Referring now to FIG. 6, an expanded view of the coil 304 is shown. The coil 304 is comprised of a material which is suitable for use as an induction coil, such as copper. The coil 304 may be a tube or a solid configuration and has variable dimensions depending on the size of the pyrolysis reactor. The coil 304 may be attached to the apparatus 300 with a fitting 326, and when the coil 304 has a hollow configuration, the coil 304 may be connected to a coolant supply conduit (not shown) which delivers a coolant, such as water, to the coil 304. In one embodiment, the coil 304 is part of a SEF Erscem reactor made by Sef-Erscem (Nanterre, France). However, other larger coils have been used in the SEF-Erscem reactor.

Referring now to FIG. 7A, a front view of the coil 304, FIG. 7B, a top view of the coil 304, and FIG. 7C, a coolant supply conduit are shown. In one embodiment, the pyrolysis reactor is small (e.g., the SEF Erscem reactor described above), and the coil 304 used is the SEF Erscem coil having height (h) of 50 mm and a width (w) of 45 mm and an inner diameter (id) of 40 mm and an outer diameter (od) of 45 mm. In another embodiment, the coil 304 was substituted in the SEF Erscem reactor with a Fluxtrol coil having a height (h) of 140 mm and a width (w) of 127 mm and an inner diameter (id) of 115 mm and an outer diameter (od) of 127 mm, which was obtained from Fluxtrol Inc. (Auburn Hills, Mich.). However other coil sizes may be used depending on the apparatus 300 size, the amount of material to be processed and the size of the container 306.

Referring again to FIG. 3 and FIG. 7A, preferably, the pyrolysis container 306 sits inside the reaction chamber 302, on an insulator, such as a ceramic riser 328. The container 306 may be surrounded by an insulator which acts as a heat barrier between the pyrolysis container 306 and the coil 304. The insulator may be made of ceramic or another insulating material and is thin enough to be placed between the coil and the container 306, for example a 1.0 mm in thickness ceramic insulating sleeve.

Referring again to FIG. 3, the Reactor 300 is equipped with a vacuum gauge 334 and a pressure adjustment valve 336. A hose 338 equipped with a flow meter 340 is attached to the vacuum pump 310, which in turn is connected to one or more valves 342 and storage vessels 346 for storing gas and/or liquids. The generator 308 supplies power to the coil 304 and comprises a power supply 348 and a capacitor 350 for delivering a field to the coil 304. In one embodiment, the apparatus is an SEF Erscem Multi-Vac 15, #341-8-007, producing up to 5 kW of power, manufactured on Oct. 21, 1991, which was modified by using either the original coil or the larger Fluxtrol coil, described above, the centrifugal apparatus is removed as well as the original vacuum pump, which was replaced with an external Bush brand pump (Bush USA, Virginia Beach, Va.). The pump 310 removes air from the chamber 302 and creates a set point pressure during pyrolysis. The pump 310 also moves process gases and/or liquids from the chamber 302 to a storage vessel 346. The storage vessel 346 acts to segregate process gases from the environment and holds collected material until further processing, shipment, or on-site use. The apparatus 300 may also be equipped with an external (or other) timer to regulate the process, and a water cooler (not shown) to cool the coil 304.

The apparatus 300 may be of varying sizes, to accommodate material for pyrolysis on the gram to ton scale. The components 302-350 are accordingly scaled for the varying size of reactor.

Figure 8:
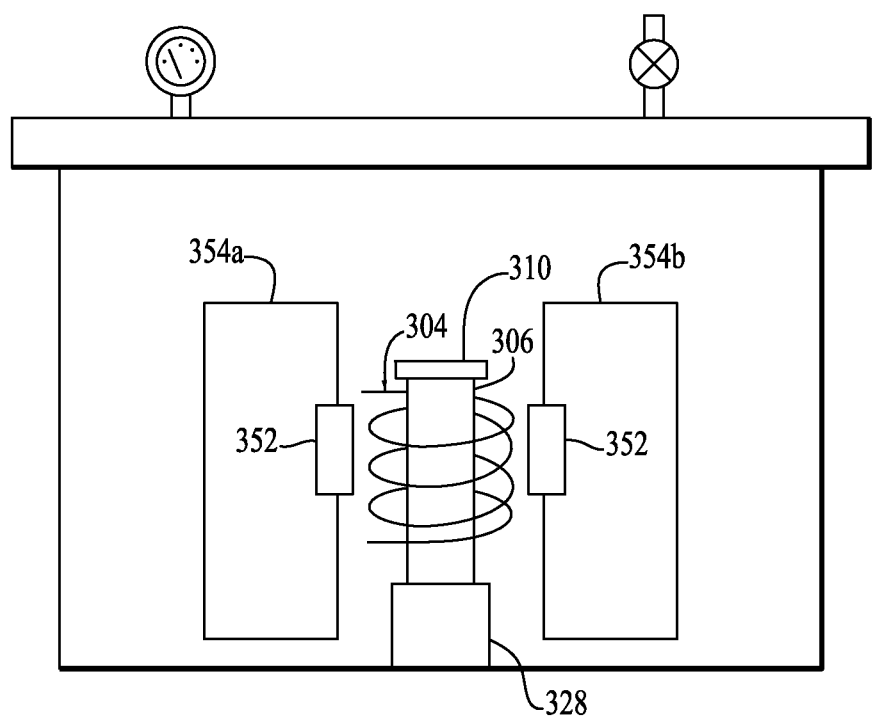
FIG. 8 is a front view of the coil and soft magnets according to another embodiment of the invention.

In a preferred embodiment, the pyrolysis chamber 302 is equipped with one or more soft magnets. Referring now to FIG. 8, a preferred embodiment of the apparatus 300 shown in FIG. 3 is shown having a pair of magnets 352. The one or more magnets 352 are preferably positioned within the chamber 302 and on the outside of the coil 304. The magnets 352 may be positioned on a ceramic block 354a and 354b or another insulating material. The one or more soft magnets 352 produce a magnetic field in the pyrolysis process. The soft magnets 352 can be used to enhance the magnetic field during the pyrolysis process. The distance from the container 306, as well as the magnet strength, manipulates the field properties. According to one example, grade N50, 2 inch×1 inch thick disc, rare earth neodymium magnets are positioned within the chamber during the pyrolysis reaction.

According to a preferred embodiment of the process shown in FIG. 1, employing the apparatus shown in FIG. 3, first, a material is selected for the pyrolysis process, and the pyrolysis parameters are determined. Next, the material is placed in the pyrolysis container 306, and the container is closed. The container 306 is placed within the induction coil 304 within the pyrolysis chamber 302 of the pyrolysis apparatus 300. The pyrolysis chamber 302 is closed, and air is evacuated from the chamber to create a vacuum within the pyrolysis chamber, employing the vacuum pump 310. The pyrolysis apparatus preferably has a valve 342, which may be a three-way valve, which is adjusted to evacuate air from the chamber 302, and which may be routed into the ambient air. The chamber 302 is evacuated until a selected pressure is achieved, as indicated on the vacuum gauge 334 on the apparatus 300, according to the selected process parameters. For example, a selected pressure may be varied for different materials, selected products, but preferably is less than 20 mm Hg, with a range of from about 17 mm Hg to 19 mm Hg, for most materials. The pressure is kept at the selected pressure or within a selected range until the pyrolysis process is terminated. The apparatus 300 is then prepared to capture process emissions. The type of storage vessel 346 is dependent on the pyrolysis material and products produced by the process. When the chamber 302 reaches the selected pressure, the valve 342 is adjusted to route the pyrolysis products to the storage vessel 346. The apparatus 300 is then energized by delivering power from the power supply 348 through the capacitor to the coil 304. The generator may have an amp meter to observe the actual frequency. The apparatus 300 is energized to a set point frequency according to the selected parameters for the pyrolysis material, and the power is maintained at the set point frequency according to the selected process parameters. The apparatus 300 may include a timer for manual or automatic shut off of the reactor after the elapsed process time. Power may be modulated during the process according to certain embodiments. For example, according to the process parameters, the power may be 10 A for 10 seconds and then 0 A for 2 seconds, and then power may be resumed to maintain the process temperature and pressure during the pyrolysis reaction.

After the reactor 300 has been energized, the process gas will begin to flow. The apparatus 300 may be equipped with a flow meter 340 to determine gas flow. The flow meter 340 may be observed to determine completion of the pyrolysis reaction. Gas produced from the pyrolysis reaction flows through the chamber 302 and vacuum hose 338, to an exit port 352 and storage vessel 346. The reaction is continued until gas production ceases, as observed in the flow meter 340.

Upon completion of the pyrolysis reaction, the power is reduced to zero. Gas collection is continued until all process gas is removed from the chamber 302. The flow of process gas is reduced after the process is terminated. The flow meter may be observed to determine when the production of the process gas ceases. For example, the flow meter will be at or near zero when all the gas is evacuated. When the gas flow ceases, the reactor is then de-energized. The apparatus 300 is then prepared for the termination of the process. First, the gas storage vessel valve is closed to prevent escape of the process gas(es) to the environment. The gases can be stored and shipped or used on-site, such as for power generation. Then, the chamber pressure adjustment valve is opened. The chamber pressure will then return to ambient after the valve is moved to the open position. The chamber door is then opened and the pyrolysis container 306 is removed from the chamber. The residual solids from the pyrolysis reaction may then be removed from the pyrolysis container 306. The solids may then be sorted, disposed as waste, reused or further processed.

What is claimed is:

1. A process for the pyrolysis of organic material in a pyrolysis apparatus, comprising the steps of:

a) selecting an organic material for pyrolysis;
b) selecting process parameters for the selected material, the selected process parameters including a selected power level;
c) placing the selected material in a pyrolysis container, the pyrolysis container comprising a conducting body and a vented portion;
d) inserting the pyrolysis container into an induction coil within a process chamber;
e) closing the process chamber;
f) evacuating the process chamber to create a vacuum within the process chamber;
g) preparing the pyrolysis apparatus to capture pyrolysis products;
h) transferring power to the induction coil;
i) maintaining power at the selected power level to cause the pyrolysis container to become heated and the material in the pyrolysis container to decompose, producing pyrolysis products comprising gas, liquid, or both liquid and gas, including lower order carbon containing products;
j) withdrawing the pyrolysis products from the pyrolysis container; and
k) collecting one or more gas or liquid withdrawn pyrolysis products in a storage area for use of the lower order carbon containing products for use as fuel and/or feedstock chemicals.

2. The process according to claim 1 further comprising:
l) cease transferring power to the induction coil; and
m) removing the processed material from the pyrolysis reactor.

3. The process according to claim 1 wherein at least one of the pyrolysis products collected in the storage area is a gas.

4. The process according to claim 1 wherein collecting the pyrolysis products in step k) comprises passing the pyrolysis product from the pyrolysis container through the pyrolysis reactor to a storage vessel in the storage area.

5. The process according to claim 4 wherein the pyrolysis products comprise a gas which is collected in a gas storage vessel attached to the pyrolysis reactor.

6. The process according to claim 4 wherein the pyrolysis products comprise a liquid which is collected in a liquid storage vessel attached to the pyrolysis reactor in the storage area.

7. The process according to claim 1 wherein the process parameters include a selected pressure, thermal field and magnetic field.

8. The process according to claim 1 wherein the process chamber contains a soft magnet.

9. The process according to claim 1 wherein the organic material selected is a solid and the pyrolysis container further comprises a filter.

10. The process according to claim 1 wherein the organic material selected is a liquid and the pyrolysis container comprises a vented portion comprising an inner vial and an outer tube comprising the conducting body.

11. The method of claim 1 wherein the step of evacuating comprises utilizing a vacuum system, and wherein the pyrolysis container comprises a filter to trap processed materials from escaping into the vacuum system from the pyrolysis container.

12. The method of claim 1 comprising the additional step of applying a magnetic field to the selected material in the pyrolysis container with a soft magnet.

13. The method of claim 1 wherein the pyrolysis products comprise solids.

14. A process for the pyrolysis of organic material in a pyrolysis apparatus, comprising the steps of:
a) selecting an organic material for pyrolysis;
b) selecting process parameters for the selected material, the selected process parameters including a selected power level;
c) placing the selected material in a pyrolysis container, the pyrolysis container comprising a conducting body and a vented portion;
d) inserting the pyrolysis container into an induction coil within a process chamber, the process chamber comprising a soft magnet;
e) closing the process chamber;
f) evacuating the process chamber to create a vacuum within the process chamber;
g) transferring power to the induction coil to create a thermal field and a magnetic field within the pyrolysis chamber; and
i) maintaining power at the selected power level to cause the pyrolysis container to become heated and the material in the pyrolysis container to decompose, producing pyrolysis products wherein the organic material comprises higher order carbon containing feedstock material and the pyrolysis products comprise lower order carbon containing products and the collecting step comprises collecting one or more of the lower order carbon containing products for use as fuel and/or feedstock chemicals.

15. The method according to claim 14 wherein the lower order carbon containing products comprise one or more hydrocarbon products selected from the group consisting of liquids, gases, and carbon black.

16. The method according to claim 14 wherein one or more of the lower order carbon containing products is a feedstock chemical.

17. The method according to claim 14 wherein the carbon containing feedstock material is selected from the group consisting of polymer containing waste materials, waste oil and crude oil.

18. The method according to claim 17 wherein the carbon containing waste material comprises tires.

19. The method according to claim 17 wherein the carbon containing waste material comprises plastic.

* * * * *